United States Patent
Schmidt et al.

(10) Patent No.: US 8,307,738 B2
(45) Date of Patent: Nov. 13, 2012

(54) COAXIAL TRANSMISSION, ESPECIALLY HOLLOW SHAFT TRANSMISSION FOR INDUSTRIAL DRIVE ENGINEERING

(75) Inventors: Michael Schmidt, Giebelstadt (DE); Thomas Wilhelm, Creglingen (DE); Thomas Bayer, Igersheim (DE)

(73) Assignee: Wittenstein AG, Igersheim (DE)

( * ) Notice: Subject to any disclaimer, the term of this patent is extended or adjusted under 35 U.S.C. 154(b) by 498 days.

(21) Appl. No.: 12/520,948

(22) PCT Filed: Feb. 25, 2008

(86) PCT No.: PCT/EP2008/001467
§ 371 (c)(1), (2), (4) Date: Jun. 23, 2009

(87) PCT Pub. No.: WO2008/119418
PCT Pub. Date: Oct. 9, 2008

(65) Prior Publication Data
US 2010/0024593 A1    Feb. 4, 2010

(30) Foreign Application Priority Data

Apr. 2, 2007 (DE) .......................... 10 2007 016 182
Apr. 24, 2007 (DE) .......................... 10 2007 019 607

(51) Int. Cl.
F16H 33/00 (2006.01)
F16H 35/00 (2006.01)
F16H 37/00 (2006.01)

(52) U.S. Cl. ....................................... 74/640

(58) Field of Classification Search ............ 74/439, 74/640
See application file for complete search history.

(56) References Cited

U.S. PATENT DOCUMENTS

| | | | |
|---|---|---|---|
| 2,966,808 A | 1/1961 | Grudin | |
| 4,099,427 A | 7/1978 | Fickelscher | |
| 4,736,654 A * | 4/1988 | Ren ............................... | 475/168 |
| 4,798,104 A * | 1/1989 | Chen et al. ...................... | 74/63 |
| 5,331,695 A * | 7/1994 | Bales .............................. | 5/136 |
| 5,351,568 A * | 10/1994 | Feterl .............................. | 74/63 |
| 5,989,144 A * | 11/1999 | Chen et al. ..................... | 475/168 |
| 5,989,145 A * | 11/1999 | Bursal et al. .................. | 475/196 |
| 6,416,438 B1 * | 7/2002 | Choi et al. ..................... | 475/170 |
| 2003/0047025 A1 | 3/2003 | Ruttor | |
| 2005/0280303 A1 | 12/2005 | Klindworth | |
| 2005/0281500 A1 * | 12/2005 | Lin ................................ | 384/475 |

FOREIGN PATENT DOCUMENTS

| | | |
|---|---|---|
| DE | 312164 | 5/1919 |
| GB | 153982 | 11/1920 |
| WO | 8400589 | 2/1984 |
| WO | 9936711 | 7/1999 |

* cited by examiner

*Primary Examiner* — Roger Pang
*Assistant Examiner* — Michael Gonzalez
(74) *Attorney, Agent, or Firm* — Bachman & LaPointe, P.C.

(57) ABSTRACT

A coaxial transmission, especially a hollow shaft transmission for industrial drive engineering, having a high power density. The transmission comprises an input element (7), an element (3) and an output element, a drive torque being multiplied and transmitted between the input element (7) and the output element via a plurality of radially mobile toothed sections (5). At least one toothed section (5) has a bearing element (11) which is enlarged in its effective zone with respect to an input element (7).

23 Claims, 7 Drawing Sheets

COAXIAL TRANSMISSION, ESPECIALLY HOLLOW SHAFT TRANSMISSION FOR INDUSTRIAL DRIVE ENGINEERING

BACKGROUND OF THE INVENTION

The present invention relates to a coaxial transmission, especially hollow shaft transmission for industrial drive engineering, having high power density, with a drive element, with an element and with an output element, a step-up and a transfer of a drive torque between the drive element and output element taking place via a plurality of radially movable toothed segments, the at least one toothed segment having a supporting element in the range of action with respect to the drive element.

Conventional transmissions are known and obtainable commercially in any form and version.

Essentially three different technologies of transmissions are employed commercially. On the one hand, epicyclic transmissions are known commercially, in which, for example within a ring wheel, one or more planet wheels are provided coaxially, by means of a mostly centrally arranged sunwheel, with the transfer of a torque to a planet wheel carrier or an output element.

In planetary or epicyclic transmissions of this type, they cannot run at high transfer speeds and, because generally there are only very small possible hollow shaft diameters, they cannot transfer high torques. Moreover, transmissions of this type suffer from low rigidity and low robustness and have a low overload capacity.

Furthermore, there is the disadvantage that, especially in case of high drive-side rotational speeds, a step-up or a step-up ratio is restricted.

Furthermore, eccentric transmissions are known in which, mostly, a planet wheel is provided within an internally toothed ring wheel for transferring the torques and for effecting step-ups.

The disadvantage of eccentric transmissions is that these require high separating forces in very large bearing elements, especially in hollow shaft versions, and are suitable only for hollow shaft versions having a smaller diameter. Even here, these eccentric transmissions have low overload capacities and low robustnesses.

Moreover, the step-up ranges are restricted to about i=30 to i=100, and only at low drive rotational speeds. At higher drive rotational speeds, eccentric transmissions of this type are subject to high wear and therefore have a short service life, which is undesirable.

Moreover, eccentric transmissions of this type have high frictional losses and therefore low efficiencies when clutches or the like follow eccentric transmissions in order to shift eccentric output movement to a centric movement. Efficiency of the eccentric transmission is therefore very low.

Especially at high rotational speeds, serious vibration problems arise which are likewise undesirable.

Furthermore, harmonic drive transmissions are known, which, indeed, can also be implemented as hollow shaft transmissions, there being arranged between the drive element of mostly oval design and an internally toothed ring wheel a flexible spline, as it is known, which is designed to be soft and resilient and which transfers the corresponding torque between the drive and ring wheel and allows a step-up.

The flexible spline, as it is known, is subject to permanent loads and often fails under high torques. Moreover, the flexible spline does not have overload capacity and often quickly breaks off when torques are too high. Furthermore, the harmonic drive transmission has poor efficiency and low torsional rigidity.

DE 31 21 64 represents the prior art closest to the present invention. Said document relates to a self-locking shift transmission in which a plurality of arms, which are arranged in a stellate fashion around a shaft, are mounted with their inner ends eccentrically on the shaft. The arms are designed as two-armed levers, their centers of rotation are guided in a crossed fashion and their inner ends rest independently of one another on the driving eccentric, such that the outer ends perform a connecting rod movement. Here, said ends engage in succession into the gearwheel and drive the latter in the opposite direction to the rotation of the driveshaft. The contact surfaces are widened in relation to the tooth roots. However, said contact surfaces are fixedly connected, not connected loosely or in a joint-like manner, to the tooth or toothed wheel.

The object on which the present invention is based, therefore, is to provide a coaxial transmission of the type initially mentioned, which eliminates said disadvantages of the hitherto known coaxial transmissions, epicyclic transmissions, eccentric transmissions and harmonic drive transmissions, while force transfer between the drive element and toothed segment is to be improved markedly with the transfer of very high forces.

Moreover, the coaxial transmission is to have very high compactness and complexity, with the smallest possible installation space and lowest possible weight at a certain power rating.

The fact that the supporting element is movable, in particular in an articulated manner, in a joint-like manner, pivotably connecting or supported slidably, with respect to a basic body of the respective toothed segment and that the supporting segments together result in a segmented mounting leads to the achievement of this object.

SUMMARY OF THE INVENTION

In the present invention, it has proved advantageous to provide a coaxial transmission in which a plurality of toothed segments are linearly guided radially outward within an element.

The individual toothed segments have at one end corresponding tooth flanks which engage into corresponding tooth spaces of an outer ring wheel.

The toothed segments are moved into the toothing of the ring wheel by means of a drive element which possesses an outer profiling and an outer contour, in order to effect a stepped-up rotational movement by means of a corresponding rotational drive movement.

In this case, it has proved especially advantageous, in the present invention, to form enlarged supporting elements in the root region of the toothed segments, in order to transfer very high radially acting forces of the drive element, especially of its profiling, to the toothed segment.

In this case, the supporting elements may be connected to the toothed segment in a joint-like manner directly or indirectly, via intermediate elements, intermediate bearings or joints, or directly in one piece via corresponding contractions, narrowings or the like.

As a result of a greater length of the supporting elements in relation to the thickness of the toothed segment, the contact area of the supporting elements is markedly enlarged, so that there, in this region, a plurality of bearing elements transfer the forces of the drive element to the toothed segment. High load distribution occurs, and therefore even very high rotational speeds of the coaxial transmission, along with high torque transfer, can be ensured.

Furthermore, it has proved especially advantageous that the individual supporting elements adjacent to one another engage one in the other on the end faces and allow a certain play in the circumferential direction and in the radial direction.

However, an axial play is ensured by a corresponding engagement of end-face projections into corresponding adjacent recesses of the adjacent supporting elements.

The bearing elements are preferably needle rollers or balls which can be inserted, fully fitted or spaced apart individually, in cages or spacers with positive guidance.

In this case, it is also to come within the scope of the present invention that an additional distribution of the forces becomes possible, for example via an additional elastic bearing outer ring, between an underside of the supporting element and the bearing elements.

Overall, the present invention provides a coaxial transmission, in which extremely high forces can be transferred at very high speeds from the drive element to the radial movement of the toothed segments and therefore to the toothing of the ring wheel.

BRIEF DESCRIPTION OF THE DRAWINGS

Further advantages, features and details of the invention may be gathered from the following description of preferred exemplary embodiments and with reference to the drawing, in which:

FIG. 1c shows a part cross section, illustrated enlarged, of the coaxial transmission according to FIG. 1a;

DETAILED DESCRIPTION

Figure 1A:
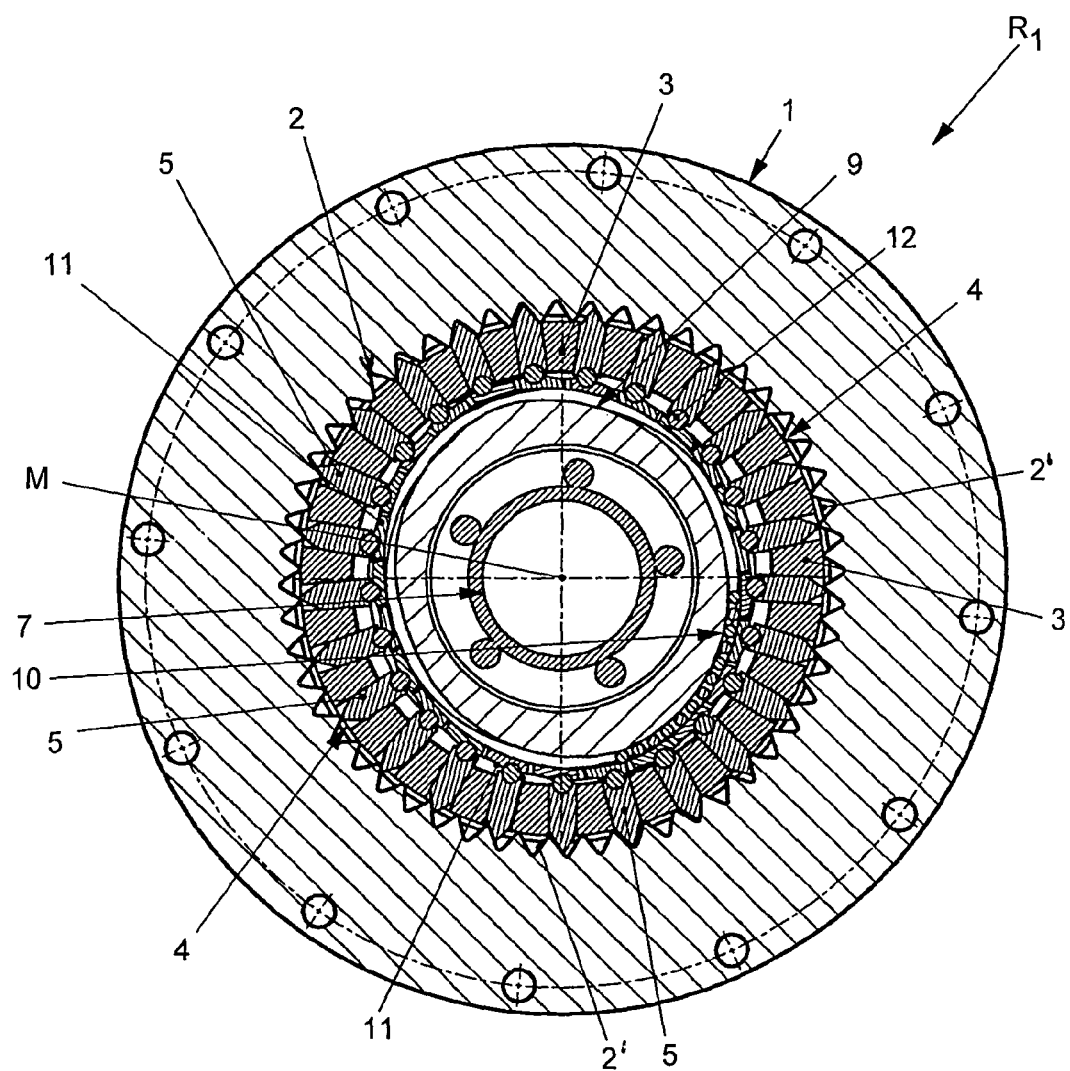
FIG. 1a shows a diagrammatically illustrated cross section through a coaxial transmission.

According to FIG. 1a, a coaxial transmission $R_1$ has a ring wheel 1 which possesses an internal toothing 2 with a plurality of tooth spaces 2'. An element 3 is inserted in an annulus-like manner within the ring wheel 1, a plurality of toothed segments 5 being inserted radially next to one another and into corresponding guides 4 in the annulus-like element 3. The toothed segments 5 are mounted so as to be displaceable radially to and fro within the guide 4 and have a tooth flank 6.

Within the element 3 having received toothed segments 5 is provided a drive element 7 designed as a shaft or as a hollow shaft and having an outer profiling 8 which, for example with a contour 9, may be designed as an elevation in the polygonal or cam-like manner.

Figure 1B:
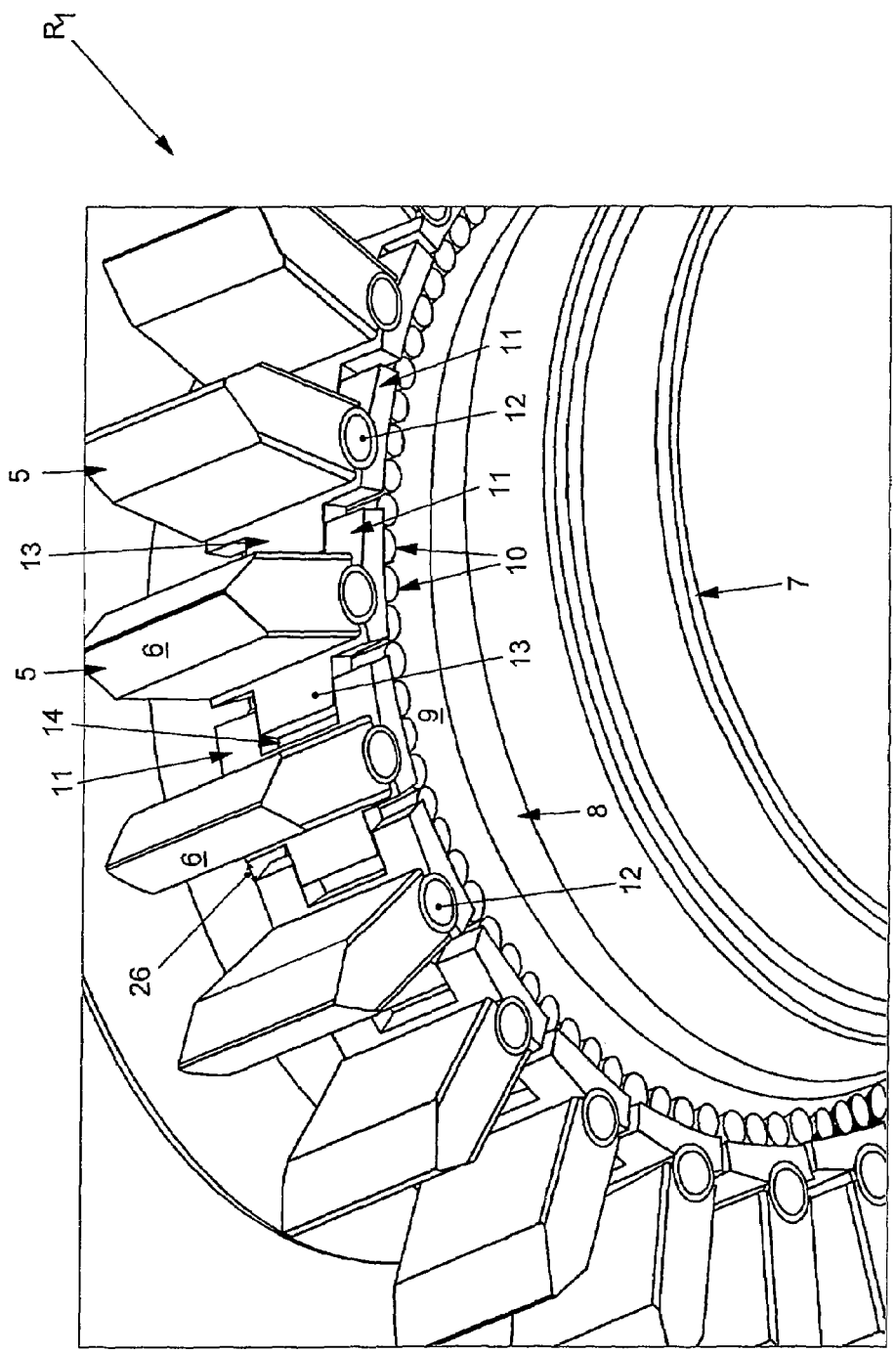
FIG. 1b shows a perspective top view of part of the coaxial transmission in the region of the drive element and toothed segments.
Figure 1C:
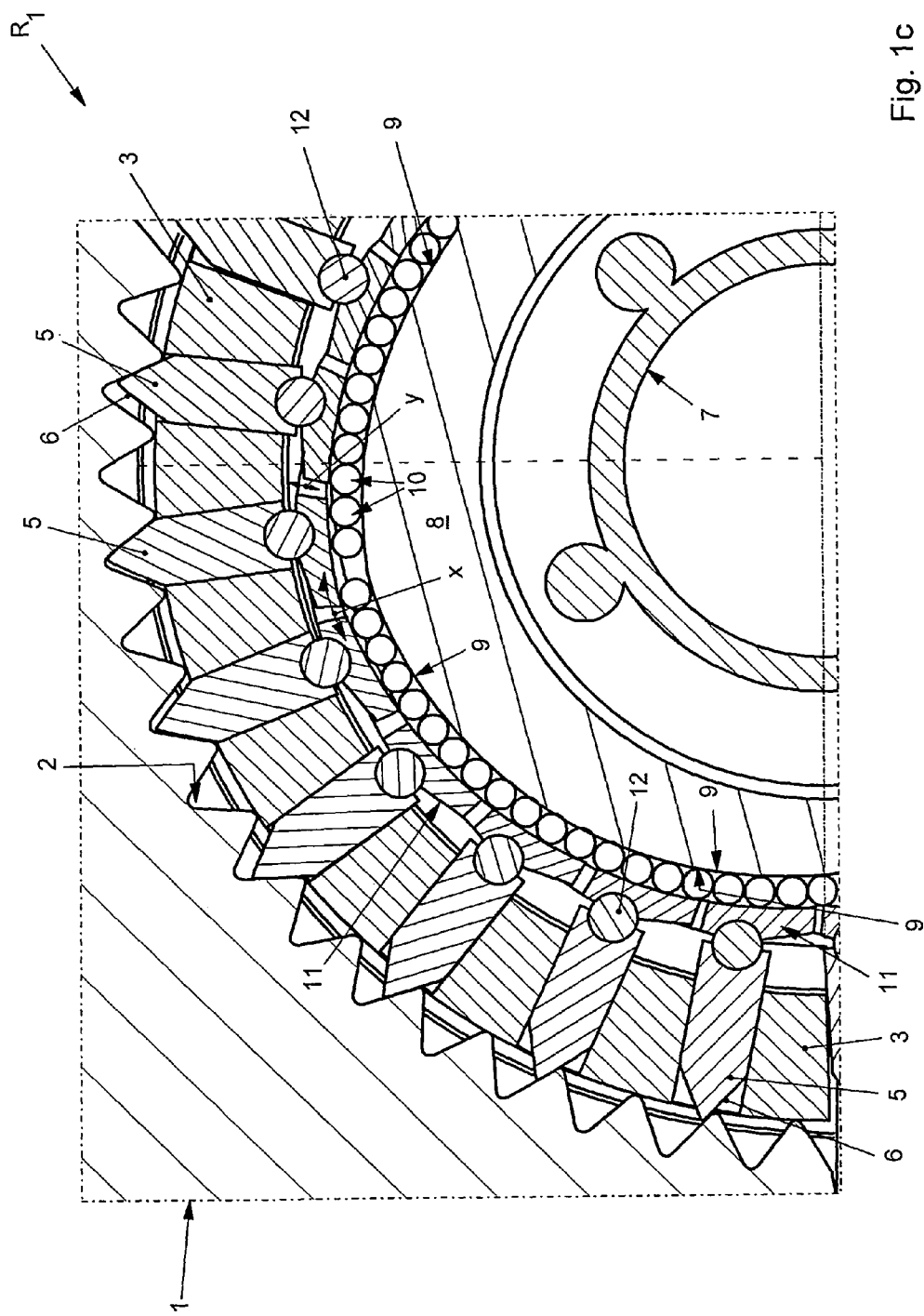

Bearing elements 10 are likewise provided between the outer contour 9 of the profiling 8 of the drive element 7 and the toothed segments 5, as is indicated especially in FIGS. 1b and 1c.

In the present invention, it has proved especially advantageous, particularly with regard to the coaxial transmission $R_1$, that a supporting element 11 of enlarged design adjoins the toothed segment 5.

As is evident especially from FIGS. 1a, 1b and 1c, a joint 12 connects the toothed segment 5 to the supporting element 11 in a joint-like manner.

Furthermore, in the present invention, it has proved to be advantageous that adjacent supporting elements 11 can be connected in a chain-like or link-like manner in each case in the end-face region of the supporting elements 11, while at the same time a play is possible in the direction of the double arrow x illustrated, that is to say with respect to the movement of the circumferential surface, and a play is possible in the y-direction, that is to say in the radial direction, as illustrated in FIG. 1c.

In this case, it has proved especially advantageous that the supporting element 11 can be adapted to the contour 9 of the profiling 8 by means of the joint 12 and is thereby at the same time tied to the positively guided position of the toothed segment 5 inserted in the guide 4.

The supporting element 11 can therefore easily be adapted in a joint-like manner, during the rotation or rotational movement of the drive element 7 with respect to the ring wheel 1 and/or to the element 3, to the contour 9 of the drive element 7, said contour changing as a result of rotation.

In the present exemplary embodiment, according to FIGS. 1a, 1b and 1c, the supporting elements 11 lie directly on the bearing elements 10 which, in turn, are supported on the outside on the contour 9 of the drive element 7.

A plurality of rolling bodies, in particular needle rollers or balls, are preferably used as bearing elements 10.

With regard to the functioning of the coaxial transmission, reference is made to German patent application DE 10 2006 042 786. The functioning is described exactly there.

The present application relates to a further development and an improvement in the kinematics between the drive element 7 and element 3, especially in the region of the mounting of the toothed segments 5.

FIG. 1b illustrates part of the coaxial transmission $R_1$ in perspective. It can be gathered there, how the individual supporting elements 11 engage one in the other by corresponding projections 13 and recesses 14 next to one another on the end faces and, as illustrated in FIG. 1c, allow play in the x- and y-direction. By the projection 13 of one supporting element 11 engaging into the recess 14 of the adjacent supporting element 11, good guidance and, at the same time, mounting and hold in the axial direction are ensured.

It is also important in the present invention, however, that, because the supporting elements 11 are enlarged, they are supported and cushioned via a plurality of individual bearing elements 10, in particular needle bearings, so that very high radial forces can be absorbed by the toothing 2 for operating the coaxial transmission $R_1$.

Figure 3C:
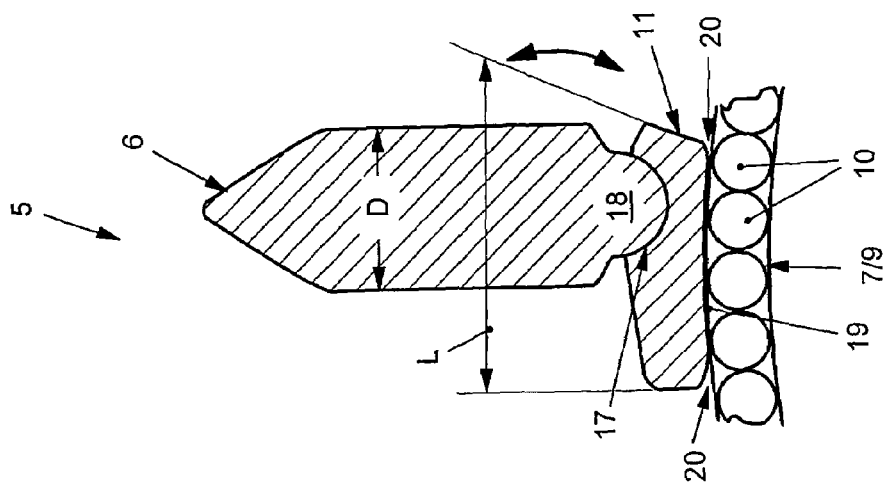
FIGS. 3a to 3c show cross-sectionally enlarged illustrations of individual toothed segments with different directly or indirectly connected and adjoining supporting elements for support on bearing outer rings or needle bearings.
Figure 3B:
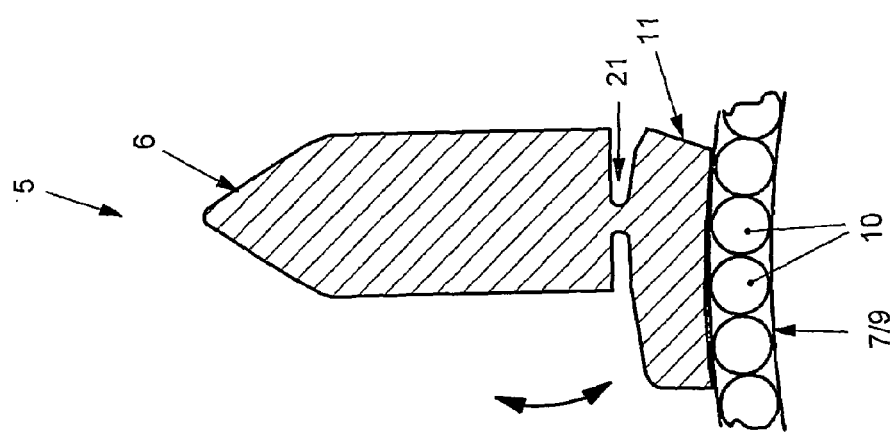
Figure 3A:
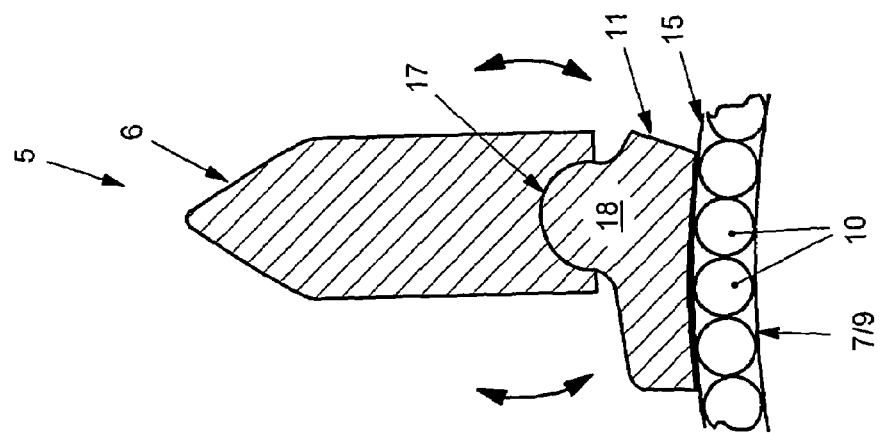

In the present invention, furthermore, it has proved advantageous that, as is not illustrated in any more detail here and is indicated merely in FIG. 3a, a bearing outer ring 15 (FIG. 3a) can be inserted between the supporting element 11 and the bearing element 10 or directly between the supporting element 11 and a contour 9 of the drive element 7. The bearing outer ring 15 is of the elastic type and assists force distribution between the supporting element 11 and bearing element 10 or force distribution between the supporting elements 11 and the outer contour 9 of the drive element 7.

Figure 2:
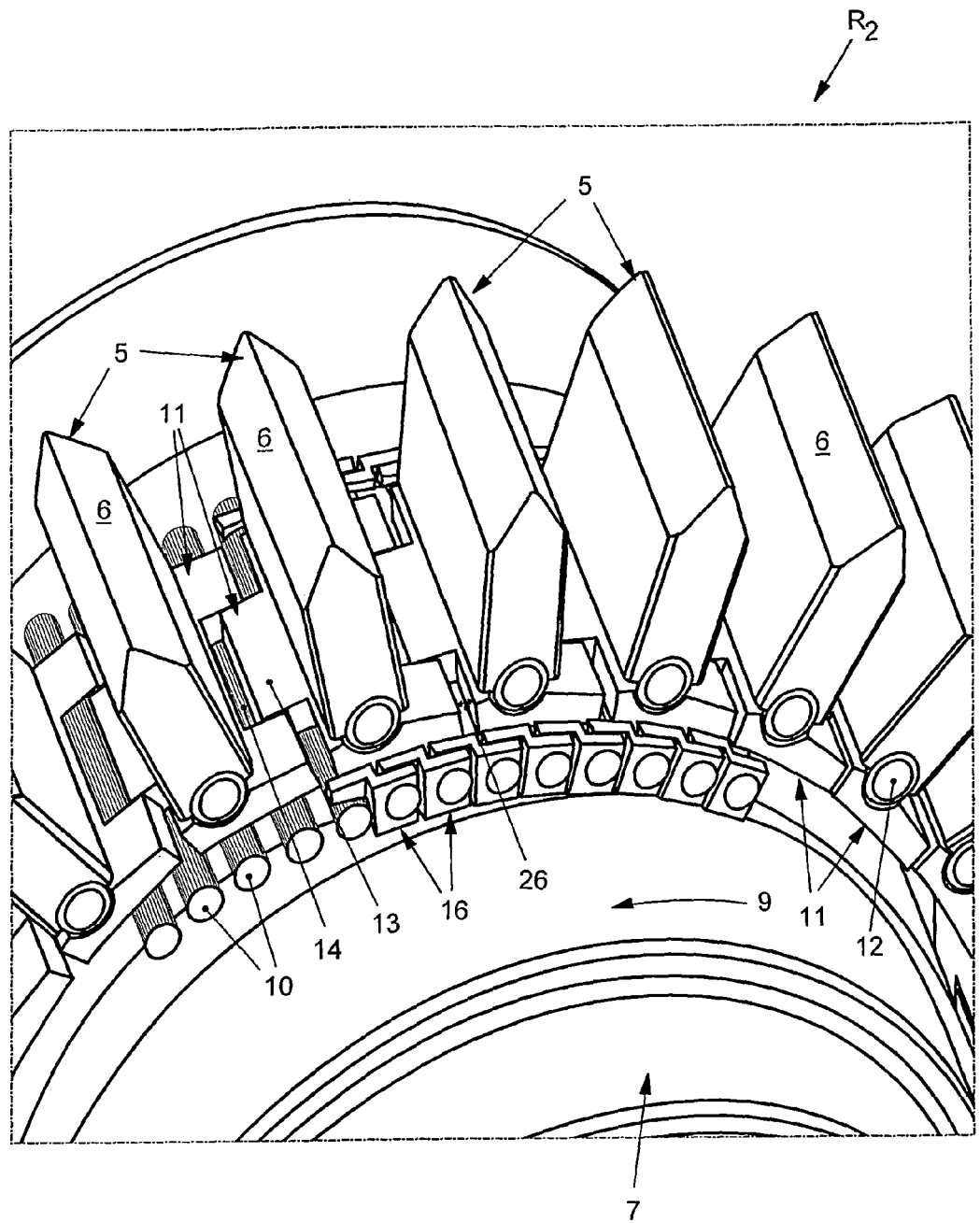
FIG. 2 shows a diagrammatically illustrated perspective illustration of a further exemplary embodiment of a coaxial transmission in the region of toothed segments and the drive element.

In the exemplary embodiment of the present invention according to FIG. 2, a coaxial transmission $R_2$ is shown, in which spacers 16 are provided between the supporting elements 11 and the drive elements 7, especially its contours 9, and between individual adjacent bearing elements 10, especially needle rollers. The spacers 16 in each case engage radially and on the end faces onto the bearing elements 10, preferably on both sides, and space these apart from one another in a chain-like or link-like manner.

Thus, the individual needle rollers can be spaced radially apart from one another around the contour 9 of the drive element 7, a guidance of the individual supporting elements 11 in each case being ensured laterally.

FIG. 3*a* illustrates, enlarged, a toothed segment 5 with a supporting element 11, a corresponding profiling 18 of the supporting element 11 being provided in a recess 17 in the root region of the toothed segment 5, so that a joint-like movement of the supporting elements 11 with respect to the toothed segment 5 is also ensured.

As illustrated in FIG. 3*c*, it may also be conceivable to form the corresponding profiling 18 from the root region of the toothed segment 5, said profiling then cooperating in a joint-like manner with a corresponding recess 17 of the supporting element 11.

If, for example, the use of a bearing outer ring 15, as illustrated in FIG. 3*a*, is dispensed with, it has proved advantageous if the supporting elements 11 have introduction chamfers 20 on their underside 19 directed toward the bearing element 10, particularly in the end-face regions.

Thus, for example without an interposed bearing outer ring 15, the load can be transferred via the bearing elements 10 directly to the supporting element 11 and therefore directly to the toothed segment 5.

Furthermore, in the present invention, it is advantageous that the supporting elements 11 have on the end faces corresponding overlaps 13, 14, for example as a projection 13 or recess 14 or as a setback, in order in the circumferential direction to ensure, as a segmented bearing outer ring, a guidance of the bearings 10 in the circumferential direction.

Moreover, a defined gap 26 is established between two supporting elements 11, spaced apart on the end faces, as a function of the contour 9 or profiling 8 of the drive element 7, in order to compensate different radii of the drive element 7 during a rotational movement in cooperation with the supporting elements 11.

In the exemplary embodiment according to FIG. 3*b*, it is illustrated that the supporting element 11 and toothed segment 5 are formed in one piece, the contraction 21, as a taper, being formed in the root region of the toothed segment 5, in order to allow an articulated or joint-like pivoting of the supporting elements 11 with respect to the toothed segment 5, as indicated in the direction of the double arrow.

In the present invention, however, it is important, as is also illustrated clearly in FIGS. 3*a* to 3*c*, that a length L of the supporting elements 11 is greater than a thickness D of the toothed segment 5.

The length L of the supporting elements 11 may amount to 1.5 to 4 times the thickness D of the toothed segment 5. This is likewise to come within the scope of the present invention.

Figure 4:
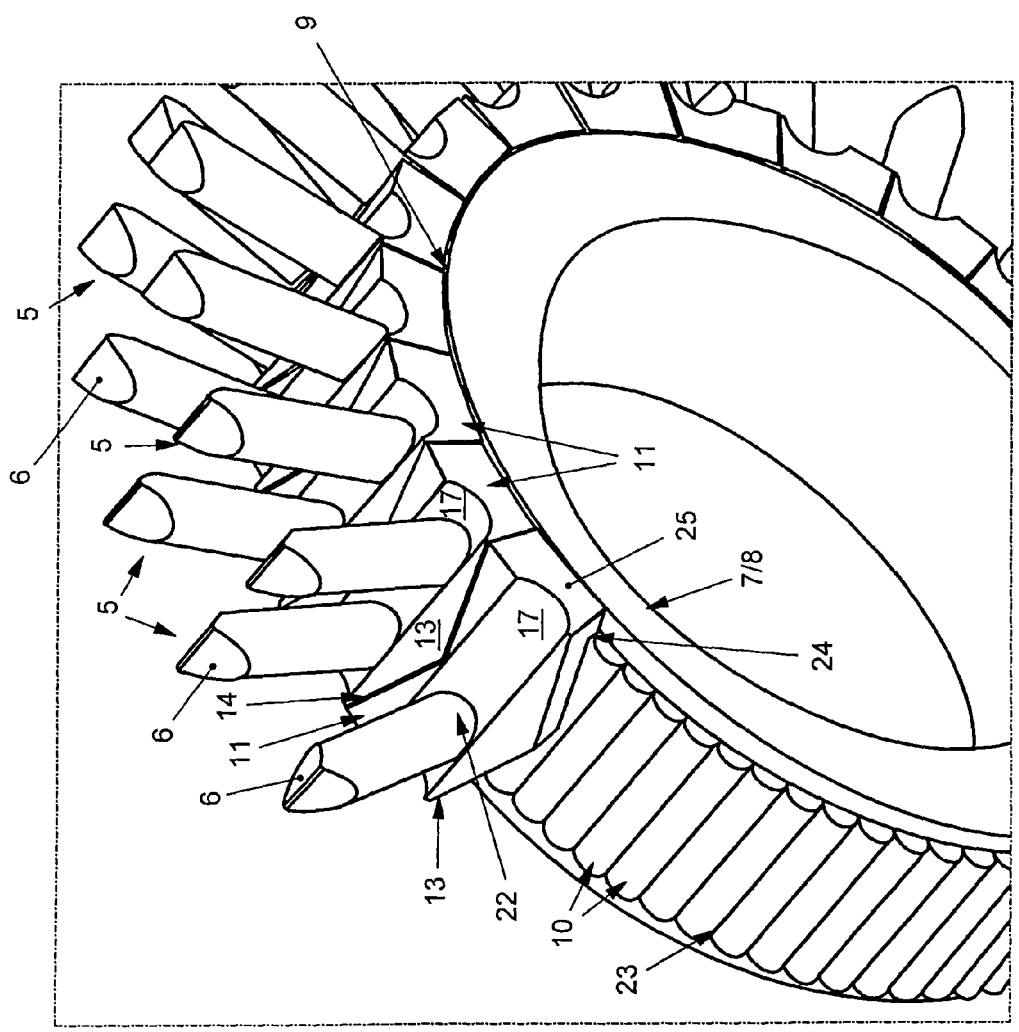
FIG. 4 shows a diagrammatically illustrated perspective illustration of part of a further exemplary embodiment of a coaxial transmission with toothed segments and supporting elements.

Furthermore, it has proved to be especially advantageous in the present invention, as is clear particularly from the exemplary embodiment according to FIG. 4, that a plurality of supporting elements 11 are arranged, spaced apart radially next to one another, on an outer contour 9 of the drive element 7. In this case, the bearing elements 10 are embedded in a bearing groove 23 on the outside in the contour 9 or profiling 8, so that said bearing elements cannot emerge axially either in one direction or the other.

Figure 5:
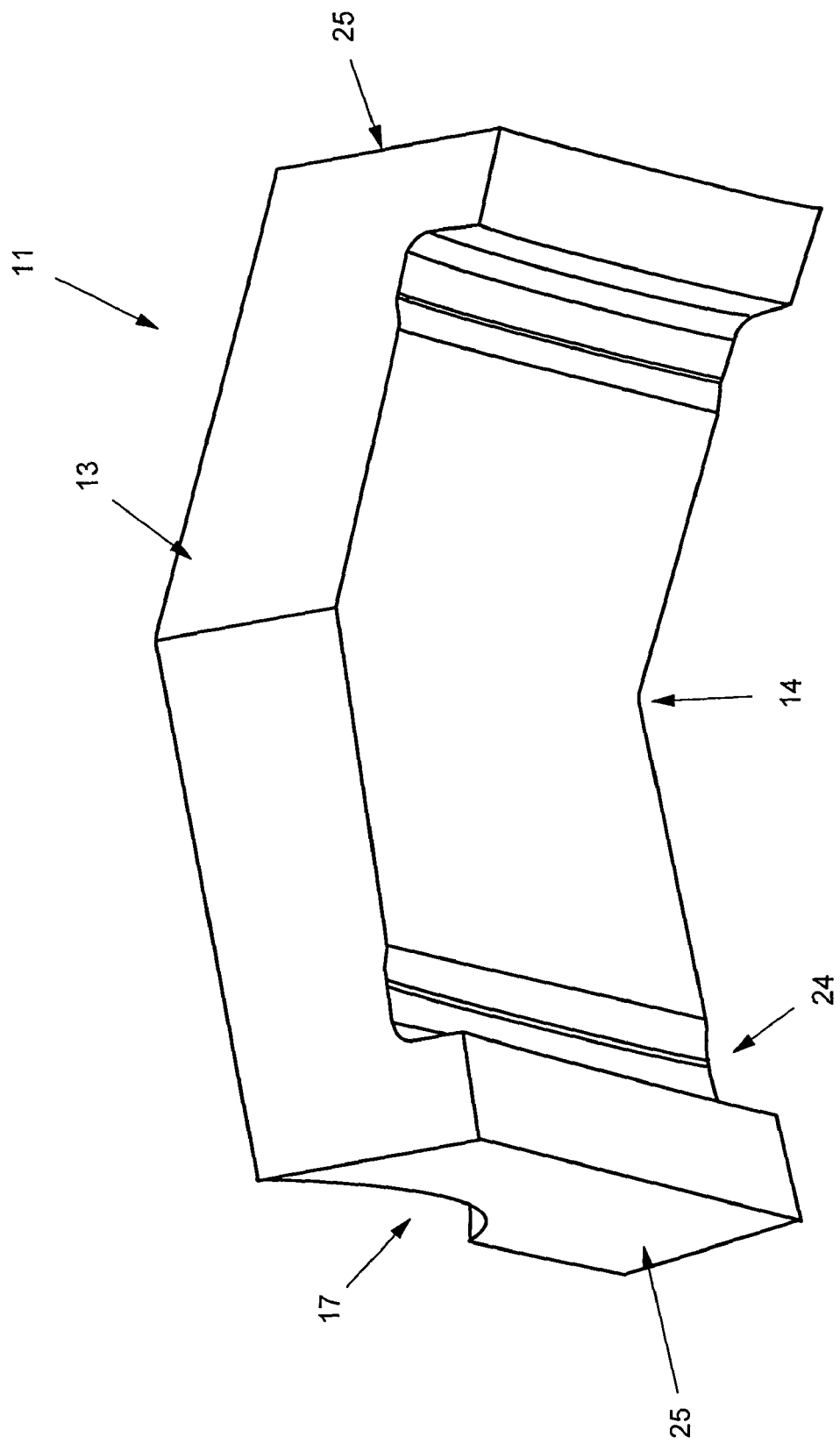
FIG. 5 shows a perspective bottom view of an exemplary embodiment of a supporting element for transferring the thrust movement of the toothed segments.

A plurality of supporting elements 11 arranged next to one another are laid onto the bearing elements 10 and likewise possess corresponding bearing grooves 24 on their underside, so that, as illustrated in FIG. 5, corresponding flanges 25 engage over the bearing elements 10 on the end faces, with the result that the bearing element 11 is held, secured axially, on the bearing elements 10, particularly the needle rollers, and allows optimal mounting radially.

The supporting element 11 possesses laterally a projection 13 which is preferably triangle-like and is shaped as an obtuse triangle, and engages into a corresponding matching recess 14 of an adjacent supporting element 11. The supporting element possesses, on the one hand, a corresponding projection 13 and, on the other hand, a corresponding recess 14 which serves for the engagement of the projection 13 of the adjacent supporting element 11.

Furthermore, the corresponding recess 17 is preferably designed to be continuous, so that at least one toothed segment 5 can engage there in its root region 22.

In the present invention, it has proved to be particularly advantageous for a plurality of individual supporting elements 11 with bearing elements 10 to have a segment-like design and, as segment-like bearing outer rings, to surround the actual drive element 7, in particular its profiling 8. At the same time, the supporting element 11 serves for distributing the forces to the toothed segments 5, the toothed segments 5 being separately mounted or supported within the supporting elements 11. A bearing outer ring segmented in this way and formed from a plurality of segment-like supporting elements 11 is highly rigid and can transfer very high forces at high circumferential speeds to the individual toothed segments.

It has proved advantageous in the present invention to insert a plurality of, preferably two, cylindrically designed toothed segments 5 arranged next to one another in the axial direction into the element 3, in particular into the output element, into a corresponding, matching, cylindrical guide 4, said toothed segments then being supported together in one supporting element 11.

The invention claimed is:

1. A coaxial transmission disposed around a central axis (M) comprising:
   a drive element (7) disposed coaxially about the central axis (M), said drive element having an outer profiling (8) with a contour (9);
   a supporting element (11) mounted coaxially about the drive element on a bearing element (10), said supporting element having a plurality of spaced apart toothed segments pivotably mounted thereon and wherein the supporting element comprises a plurality of adjacent supporting elements linked together to provide for movement in a circumferential direction and define a variable gap between the adjacent supporting elements to compensate for different radii of the profiling (8);
   a guide element (3) coaxially disposed about said supporting element, said guide element having a plurality of radially extending guide slots for receiving the plurality of toothed segments; and
   a ring wheel (1) coaxially disposed about said guide element, said ring wheel having an internal toothing which engage the plurality of toothed segments which project through the guide plate.

2. The coaxial transmission as claimed in claim 1, wherein the adjacent supporting elements (11) adjacent in the circumferential direction have overlaps (13, 14) to the bearing elements (10) in the circumferential direction.

3. The coaxial transmission as claimed in claim 2, wherein the adjacent supporting elements (11) are movable relative to a respective toothed segment (5).

4. The coaxial transmission as claimed in claim 3, wherein the adjacent supporting elements (11) are mounted pivotably with respect to the toothed segments (5).

5. The coaxial transmission as claimed in claim 4, wherein the adjacent supporting elements (11) are pivotable in a joint-like manner with respect to the toothed segment (5).

6. The coaxial transmission as claimed in claim 1, wherein the adjacent supporting elements (11) are designed as segment parts.

7. The coaxial transmission as claimed in claim 6, wherein some of the adjacent supporting elements (11) overlap on end faces with other adjacent supporting elements (11) in the circumferential direction and form an axial outer guide for bearing elements (10) as a bearing outer ring.

8. The coaxial transmission as claimed in claim 1, wherein each individual adjacent supporting element (11) of the adjacent supporting elements is connectable at end faces to another of the adjacent supporting elements (11).

9. The coaxial transmission as claimed in claim 8, wherein two adjacent supporting elements (11) are connectable to one another on the end faces in a link manner and allow play with respect to one another in an x- and/or y-direction.

10. The coaxial transmission as claimed in claim 1, wherein a joint (12) is provided between the toothed segment (5) and the supporting element (11).

11. The coaxial transmission as claimed in claim 10, wherein the connecting element connects a root region of the toothed segments (5) to the supporting element (11) in a joint-like manner.

12. The coaxial transmission as claimed in claim 1, wherein toothed segments (5) slide directly or are supported slidably on the drive element (7).

13. The coaxial transmission as claimed in claim 12, wherein the toothed segments (5) are guided with respect to the drive element (7) on the bearing element (10) which is arranged radially around the drive element (7).

14. The coaxial transmission as claimed in claim 13, wherein the bearing element comprises individual bearing elements (10) arranged radially around the drive element (7) which are connected to one another elastically or in a segmented manner via corresponding spacers (16) in the form of needle or ball bearing cages.

15. The coaxial transmission as claimed in claim 14, wherein the bearing elements (10) surround the profiling (8) of the drive element (7) on the outside in a cage in a fully rolling or segmented manner.

16. The coaxial transmission as claimed in claim 1, wherein an additional elastic bearing outer ring (15) is arranged between the drive element (7) and supporting element (11).

17. The coaxial transmission as claimed in claim 16, wherein the additional bearing outer ring (15) is arranged between the bearing element (10) and the supporting element (11).

18. The coaxial transmission as claimed in claim 1, wherein an overlap (13, 14) of the adjacent supporting elements (11) on the end faces are designed to ensure a guidance of the bearing element (10) in a circumferential direction.

19. The coaxial transmission as claimed in claim 18, wherein the overlap of two adjacent supporting elements (11) engage one in the other, spaced apart from one another via the gap (26), and ensure a permanent guidance and/or covering of the bearing element (10).

20. The coaxial transmission as claimed in claim 18, wherein the adjacent supporting elements (11) have an introduction chamfer (20) for the introduction of the bearing element (10).

21. The coaxial transmission as claimed in claim 1, wherein the outer profiling (8) has an outer continuous bearing groove (23) which serves as an axial guidance of the bearing element (10).

22. The coaxial transmission as claimed in claim 1, wherein the supporting element (11) has laterally, on one side or on both sides, an at least partially overlapping flange (25) which for coaxial guidance engages over the outer bearing element (10) on one side or on both sides.

23. The coaxial transmission as claimed in claim 22, wherein bearing grooves are formed laterally in a region of the flange (25) on an underside of the supporting element (11).

* * * * *